US009930719B2

(12) United States Patent
Wu et al.

(10) Patent No.: US 9,930,719 B2
(45) Date of Patent: Mar. 27, 2018

(54) METHOD AND SYSTEM FOR CONTROLLING SIGNALING CONNECTION BETWEEN NETWORK AND TERMINAL

(71) Applicant: ZTE CORPORATION, Shenzhen, Guangdong Province (CN)

(72) Inventors: Hao Wu, Shenzhen (CN); Fang Xie, Shenzhen (CN)

(73) Assignee: ZTE CORPORATION (CN)

( * ) Notice: Subject to any disclaimer, the term of this patent is extended or adjusted under 35 U.S.C. 154(b) by 307 days.

(21) Appl. No.: 14/422,378

(22) PCT Filed: Aug. 15, 2013

(86) PCT No.: PCT/CN2013/081537
§ 371 (c)(1),
(2) Date: Feb. 19, 2015

(87) PCT Pub. No.: WO2014/029292
PCT Pub. Date: Feb. 27, 2014

(65) Prior Publication Data
US 2015/0223283 A1    Aug. 6, 2015

(30) Foreign Application Priority Data
Aug. 22, 2012 (CN) .......................... 2012 1 0301069

(51) Int. Cl.
*H04W 76/04* (2009.01)
*H04W 88/16* (2009.01)
*H04W 76/06* (2009.01)

(52) U.S. Cl.
CPC ....... *H04W 76/045* (2013.01); *H04W 76/046* (2013.01); *H04W 76/064* (2013.01); *H04W 88/16* (2013.01)

(58) Field of Classification Search
CPC ..... H04W 52/00–52/60; H04W 76/00–76/068
See application file for complete search history.

(56) References Cited

U.S. PATENT DOCUMENTS

2010/0304745 A1* 12/2010 Patel ................... H04W 52/143
455/435.1
2012/0051260 A1* 3/2012 Tamaki ................. H04W 24/02
370/253
(Continued)

FOREIGN PATENT DOCUMENTS

CN    101102557    1/2008
CN    102104941    6/2011
(Continued)

OTHER PUBLICATIONS

International Search Report Patent Application No. PCT/CN2013/081537 dated Nov. 7, 2013.
(Continued)

*Primary Examiner* — Michael Thier
*Assistant Examiner* — Prince A Mensah
(74) *Attorney, Agent, or Firm* — McAndrews, Held & Malloy, Ltd.

(57) ABSTRACT

A method and a system for controlling signaling connection between a network and a terminal are disclosed. The method includes: an MME judges whether the number of times of a terminal receiving and transmitting data in a predetermined statistical period reaches a predetermined times threshold, and if a judgment result is yes, determining that the terminal has entered a state of receiving and transmitting data frequently; the MME maintains signaling connection with the terminal; a PGW judges whether the number of times of the terminal receiving and transmitting in a predetermined lag period is less than the times threshold, and if yes, determines that the terminal has exited the state of receiving and transmitting data frequently. The disclosure prevents frequent switching between a connected mode and an idle mode of the terminal.

11 Claims, 8 Drawing Sheets

(56) References Cited

U.S. PATENT DOCUMENTS

2013/0130693 A1* 5/2013 Salvador ............... H04W 48/20
455/437
2015/0055573 A1* 2/2015 Miklos ................... H04L 65/80
370/329

FOREIGN PATENT DOCUMENTS

CN 102450064 5/2012
WO 2012074451 A1 6/2012

OTHER PUBLICATIONS

Communication pursuant to Rules 70(2) and 70a(2) EPC dated Jan. 11, 2016 corresponding to European Application No. EP 13830707.9.
Supplementary European Search Report dated Dec. 4, 2015 corresponding to European Application No. EP 13830707.9.

* cited by examiner

METHOD AND SYSTEM FOR CONTROLLING SIGNALING CONNECTION BETWEEN NETWORK AND TERMINAL

CROSS-REFERENCE TO RELATED APPLICATIONS/INCORPORATION BY REFERENCE

This application is a 371 of International Patent Application No. PCT/CN2013/081537, filed Aug. 15, 2013, entitled "METHOD AND SYSTEM FOR CONTROLLING SIGNALING CONNECTION BETWEEN NETWORK AND TERMINAL", which claims priority to Chinese Patent Application No. 201210301069.9, filed Aug. 22, 2012, entitled "METHOD AND SYSTEM FOR CONTROLLING SIGNALING CONNECTION BETWEEN NETWORK AND TERMINAL". The above-identified applications are hereby incorporated herein by reference in their entirety.

FIELD

The disclosure relates to the field of communications, including e.g., a method and a system for controlling signaling connection between a network and a terminal.

BACKGROUND

A cellular wireless communication system mainly comprises a Core Network (CN), a Radio Access Network (RAN) and a terminal (See FIG. 1, FIG. 1 is a schematic diagram of a component architecture of a cellular wireless communication system according to the related art). The CN is responsible for non-access stratum transaction, such as terminal position update or the like, which is an anchor point of a user plane. The radio access network can be two composition forms: 1, a base station; 2, the base station and a base station controller. The radio access network is responsible for access stratum transaction, such as radio resource management. Physical or logical connection may exist between the base stations according to actual situations, such as the connection between the base station 1 and the base station 2 or the connection between the base station 1 and the base station 3, and each base station may be connected to one or more core network nodes. The terminal, i.e., User Equipment (UE), refers to various devices which may communicate with the cellular wireless communication network, such as a mobile phone or a notebook or the like.

A Mobility Management Entity (MME) (the MME of an LTE network) or General Packet Radio Service (GPRS) Serving GPRS Support Node (SGSN) (the MME of a 3G network) is a unit responsible for managing terminal access control, position information update and switch in the core network, being responsible for the functions of controlling non-access stratum signaling from the core network to the terminal and registering the terminal to a network.

A Home Subscriber Server (HSS) or a Home Location Register (HLR) is an entity responsible for storing subscription data, identity information, authentication information and authorization information or the like of a terminal device in the core network. According to different situations, the HSS or HLR may be used to store identity information of a user and binding information of the user and the terminal device, or only store the identity information of the user (the binding information of the user and the terminal device may be stored by a gateway), or directly store the identity information of the terminal device. The HSS or HLR is also responsible for a user subscription database, and executing identity authentication and authorization of the user or the like. A service platform may inquire information about the user or terminal from the HSS or HLR.

A Visitor Location Register (VLR) is a network element of a 2G network, storing information required for an incoming call, an outgoing call of MS (collectively referred to as visiting clients) in the covered area and information of user subscription service and additional service, for example the phone number of the clients, the identification of the area where the client is located, service provided to the client or the like.

A Long Term Evolution (LTE) network mainly provides a high-speed packet data service for a user, but requires a 2G network to provide a voice service for the user. Therefore, the user requiring the voice service needs to register to the 2G network while registering to the LTE network. Since the voice service runs on the 2G network, when there is a voice called service, a voice service request first arrives at the 2G network, which transmits a paging request to the LTE network, and then an LTE network pages the terminal to initiates the voice service request.

Since various services is of their own characteristics, and may present different service statuses, for example, a background program of a smart mobile terminal is generally connected to the network frequently to receive and transmit data, such as submitting background data, software update and detection or other operations. Client online loop detection reflects frequent transmission of data by the terminal. In this way, the terminal frequently switches from an idle mode to a connection mode, from the connection mode to the idle mode easily, which results in large power consumption of the terminal.

Currently, no effective solution has been proposed for the problem that various frequent switching operations of the terminal cause large power consumption in the related art.

SUMMARY

A method and a system for controlling signaling connection between a network and a terminal are provided in the disclosure, so at least to solve the above problem.

According to one aspect of the disclosure, a method for controlling signaling connection between a network and a terminal is provided, including that: a Mobility Management Element (MME) judges whether the number of times of the terminal receiving and transmitting data in a predetermined statistical period reaches a predetermined times threshold, and based on that a judgment result is that the number of times of the terminal receiving and transmitting data in the predetermined statistical period, reaches the predetermined times threshold, determines that the terminal has entered a state of receiving and transmitting data frequently; the MME maintains signaling connection with the terminal; and a Packet Data Network Gateway (PGW) judges whether the number of times of the terminal receiving and transmitting in a predetermined lag period is less than the times threshold, and based on that the number of times of the terminal receiving and transmitting data in the predetermined lag period is less than the times threshold, determines that the terminal has exited the state of receiving and transmitting data frequently.

According to an embodiment of the disclosure, before the MME judges whether the number of times of the terminal receiving and transmitting data reaches the predetermined times threshold, the method further includes that: the MME configures the statistical period, the times threshold and the lag period; the MME counts the number of times of the terminal receiving and transmitting data in the statistical period, wherein the number of times of receiving and transmitting data refers to the number of service request signaling of the terminal that the MME receives in the statistical period, or the sum of the number of the service request signaling of the terminal and the number of Non-Access Stratum (NAS) signaling of bearer data that the terminal transmits to the MME.

According to an embodiment of the disclosure, after the MME maintains the signaling connection with the terminal, the method further includes that: the MME transmits the times threshold, the lag period and first state indication information to the PGW, wherein the first state indication information indicates that the terminal has entered the state of receiving and transmitting data frequently.

According to an embodiment of the disclosure, after the PGW determines that the terminal has exited the state of receiving and transmitting data frequently, the method further includes that: the MME receives second state indication information from the PGW indicating that the terminal has exited the state of receiving and transmitting state data frequently; and after the terminal ends receiving and transmitting data of this time, the MME disconnects the signaling connection with the terminal.

According to another aspect of the disclosure, a system for controlling signaling connection between a network and a terminal is provided, including: a Mobility Management Element (MME), a Packet Data Network Gateway (PGW) and the terminal, wherein the MME includes: a first judging component, configured to judge whether the number of times of the terminal receiving and transmitting data in a predetermined statistical period reaches a predetermined times threshold, and based on that a judgment result is that the number of times of the terminal receiving and transmitting data in the predetermined statistical period, reaches the predetermined times threshold, determine that the terminal has entered a state of receiving and transmitting data frequently; a first maintaining component, configured to maintain signaling connection with the terminal; and the PGW includes: a second judging component, configured to, judge whether the number of times of the terminal receiving and transmitting data frequently is less than the times threshold, and based on that the number of times of the terminal receiving and transmitting data in the predetermined lag period is less than the times threshold, determine that the terminal has exited the state of receiving and transmitting data frequently.

According to an embodiment of the disclosure, the MME further includes: a first transmitting component, configured to, after the first maintaining component maintains the signaling connection with the terminal, transmit the times threshold, the lag period and first state indication information to the PGW, wherein the first state indication information indicates that the terminal has entered the state of receiving and transmitting data frequently.

According to an embodiment of the disclosure, the MME further includes: a first receiving component, configured to receive second state indication information from the PGW indicating that the terminal has exited the state of receiving and transmitting data frequently; and a first disconnecting component, configured to, after the terminal ends receiving and transmitting data of this time, disconnect the signaling connection with the terminal.

According to still another aspect of the disclosure, a method for controlling signaling connection between a network and a terminal is provided, including that: a PGW judges whether the number of times of the terminal receiving and transmitting data in a predetermined statistical period reaches a predetermined times threshold, and based on that a judgment result is that the number of times of the terminal receiving and transmitting data in the predetermined statistical period, reaches the predetermined times threshold, determines that the terminal has entered a state of receiving and transmitting data frequently; the MME maintains signaling connection with the terminal; and the PGW judges whether the number of times of the terminal receiving and transmitting data in a predetermined lag period is less than the times threshold, and based on that the number of times of the terminal receiving and transmitting data in the predetermined lag period is less than the times threshold, determines that the terminal has exited the state of receiving and transmitting data frequently.

According to an embodiment of the disclosure, before the PGW judges whether the number of times of the terminal receiving and transmitting data reaches the predetermined times threshold, the method includes that: the MME configures the statistical period, the times threshold and the lag period; and the MME transmits the statistical period, the times threshold and the lag period to the PGW.

According to an embodiment of the disclosure, before the PGW judges whether the number of times of the terminal receiving and transmitting data reaches the predetermined times threshold, the method includes that: the PGW configures the statistical period, the times threshold and the lag period.

According to an embodiment of the disclosure, after the PGW determines that the terminal has entered the state of receiving and transmitting data frequently, the method further includes that: the PGW transmits third state indication information to the MME indicating that the terminal has entered the state of receiving and transmitting data frequently.

According to an embodiment of the disclosure, after the PGW determines that the terminal has exited the state of receiving and transmitting data, the method further includes that: the MME receives fourth state indication information from the PGW indicating that the terminal has exited the state of receiving and transmitting data frequently; and after the terminal ends receiving and transmitting data of this time, the MME disconnects the signaling connection with the terminal.

According to further aspect of the disclosure, a system for controlling signaling connection between a network and a terminal is provided, including: a Mobility Management Element (MME), a Packet Data Network Gateway (PGW) and the terminal, wherein the PGW includes: a third judging component, configured to judge whether the number of times of the terminal receiving and transmitting data in a predetermined statistical period reaches a predetermined times threshold, and based on that a judgment result is that the number of times of the terminal receiving and transmitting data in the predetermined statistical period, reaches the predetermined times threshold, determine that the terminal has entered a state of receiving and transmitting data frequently; the MME includes: a second maintaining component, configured to maintain signaling connection with the terminal; and the PGW further includes: a fourth judging component, configured to judge whether the number of times of the terminal receiving and transmitting in a predetermined lag period is less than the times threshold, and based on that the number of times of the terminal receiving and transmitting data in the predetermined lag period is less than the times threshold, determine that the terminal has exited the state of receiving and transmitting data frequently.

According to an embodiment of the disclosure, the PGW further includes: a second transmitting component, configured to, after it is determined that the terminal has entered the state of receiving and transmitting data frequently, transmit third state indication information to the MME indicating that the terminal has entered the state of receiving and transmitting data frequently.

According to an embodiment of the disclosure, the MME further includes: a second receiving component, configured to, after the PGW determines that the terminal has exited the state of receiving and transmitting data frequently, receive fourth state indication information from the PGW indicating that the terminal has exited the state of receiving and transmitting data frequently; and a second disconnecting component, configured to, after the terminal ends receiving and transmitting data of this time, disconnect the signaling connection with the terminal.

By the disclosure, it is determined that the terminal has entered the state of receiving and transmitting data frequently when the number of times of the terminal receiving and transmitting data reaches a predetermined number of times, and the signaling connection between the MME and the terminal is maintained; it is determined that the terminal has exited the state of receiving and transmitting data when the number of times of the terminal receiving and transmitting the data is less than the predetermined number of times, and the connection between the MME and the terminal is disconnected. By this way, the problem that various frequent switching operations of the terminal cause large power consumption is solved, and the effect of preventing frequent switching between a connected mode and an idle mode of the terminal is achieved.

BRIEF DESCRIPTION OF THE DRAWINGS

The accompanying drawings described herein serve to provide a further understanding of the disclosure, and constitute a part of this application. The schematic embodiments of the disclosure and description thereof serve to explain the disclosure rather than to limit the disclosure inappropriately. In the drawings.

DETAILED DESCRIPTION OF THE EMBODIMENTS

Hereinafter, the disclosure will be described in detail with reference to the accompanying drawings and in conjunction with the embodiments. It should be noted that the embodiments of the application and the features of the embodiments may be combined with each other without any conflict.

First, the specific mode of implementation of the technical proposal of the application is introduced briefly, the implementation flows of the technical proposal is described as follows:

1. service state parameters are configured in the network, the service state parameters are used for determining whether the state of the terminal is conformed to the state of transmitting data frequently, wherein the service state parameters comprises a statistical time T, a times threshold Nmax, and a lag time Thyst;

2. the number of times N of the terminal receiving and transmitting data within time T is recorded in the network, and based on that N reaches or exceeds Nmax within time T, it is determined that the terminal has entered the state of receiving and transmitting data frequently;

3. based on that the terminal has entered the state of receiving and transmitting data frequently, the network maintains signaling connection with the terminal;

4. after the terminal has entered the state of receiving and transmitting data frequently, the number of times N of the terminal receiving and transmitting data within time T is continuously recorded in the network, and based on that N is less than Nmax within time Thyst, it is determined that the terminal has exited the state of receiving and transmitting data frequently.

The specific mode of implementation of the application is further described in conjunction with two implementation modes (Embodiment I and Embodiment II).

Figure 1:
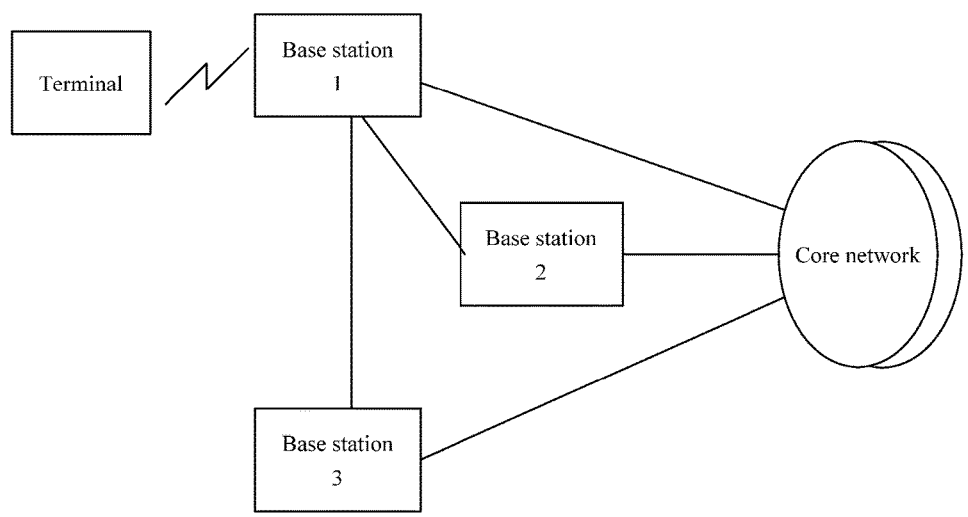
FIG. 1 is a schematic diagram of composition architecture of a cellular wireless communication system according to related art.
Figure 2:
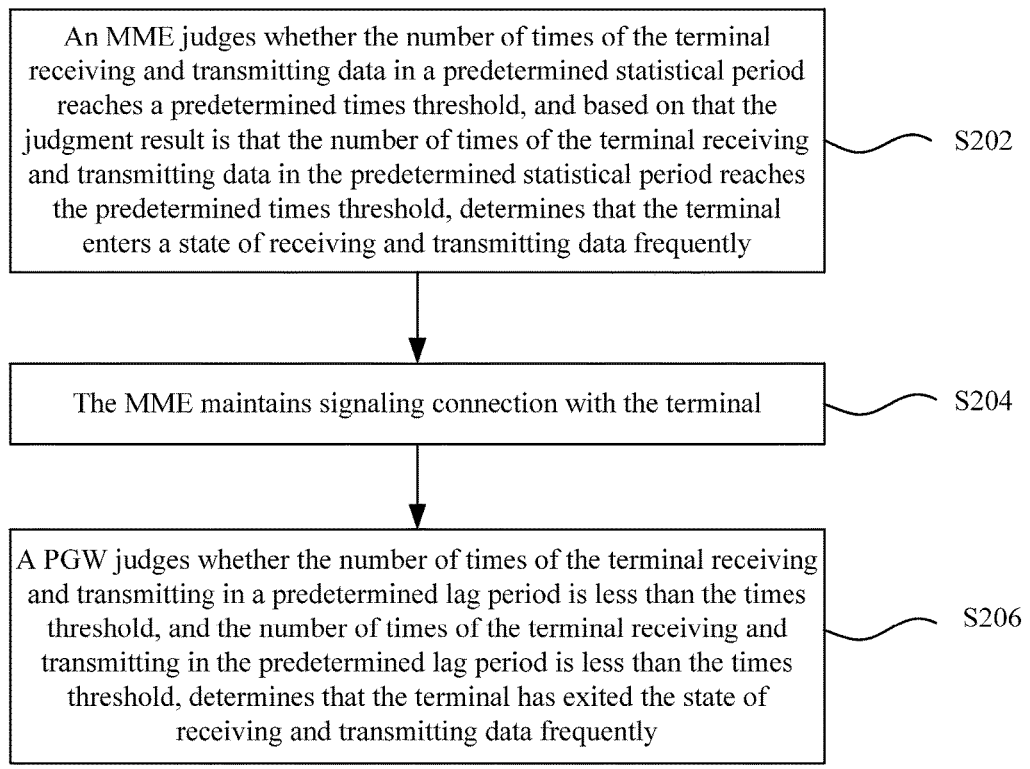
FIG. 2 is a flowchart of a method for controlling signaling connection between a network and a terminal according to Preferred Embodiment I of the disclosure.

FIG. 2 is a flowchart of a method for controlling signaling connection between a network and a terminal according to embodiment I of the disclosure. As shown in FIG. 2, the method mainly includes the following steps (Step 202 to Step 206):

Step 202: An MME judges whether the number of times of the terminal receiving and transmitting data in a predetermined statistical period reaches a predetermined times threshold, and based on that the judgment result is that the number of times of the terminal receiving and transmitting data in the predetermined statistical period reaches the predetermined times threshold, determines that the terminal has entered a state of receiving and transmitting data frequently;

Step 204: The MME maintains signaling connection with the terminal; and

Step 206: A PGW judges whether the number of times of the terminal receiving and transmitting in a predetermined lag period is less than the times threshold, and based on that the number of times of the terminal receiving and transmitting in a predetermined lag period is less than the times threshold, determines that the terminal has exited the state of receiving and transmitting data frequently.

In the embodiment, before the MME judges whether the number of times of the terminal receiving and transmitting data reaches the predetermined times threshold, the method includes that: the MME configures the statistical period, the times threshold and the lag period; the MME counts the number of times of the terminal receiving and transmitting data in the statistical period, wherein the number of times of receiving and transmitting refers to the number of service request signaling of the terminal that the MME receives in the statistical period, or the sum of the number of the service request signaling of the terminal and the number of NAS signaling of bearer data that the terminal transmits to the MME.

In the embodiment, after the MME maintains the signaling connection with the terminal, the method further includes that: the MME transmits the times threshold, the lag period and first state indication information to the PGW, wherein the first state indication information indicates that the terminal has entered the state of receiving and transmitting data frequently.

In the embodiment, after the PGW determines that the terminal has exited the state of receiving and transmitting data frequently, the method further includes that: the MME receives second state indication information from the PGW indicating that the terminal has exited the state of receiving and transmitting data frequently; and after the terminal ends receiving and transmitting data of this time, the MME disconnects the signaling connection with the terminal.

The method for controlling signaling connection between the network and the terminal provided by Embodiment I is further described below in conjunction with FIG. 3 and preferred embodiment I.

Preferred Embodiment I

Figure 3:
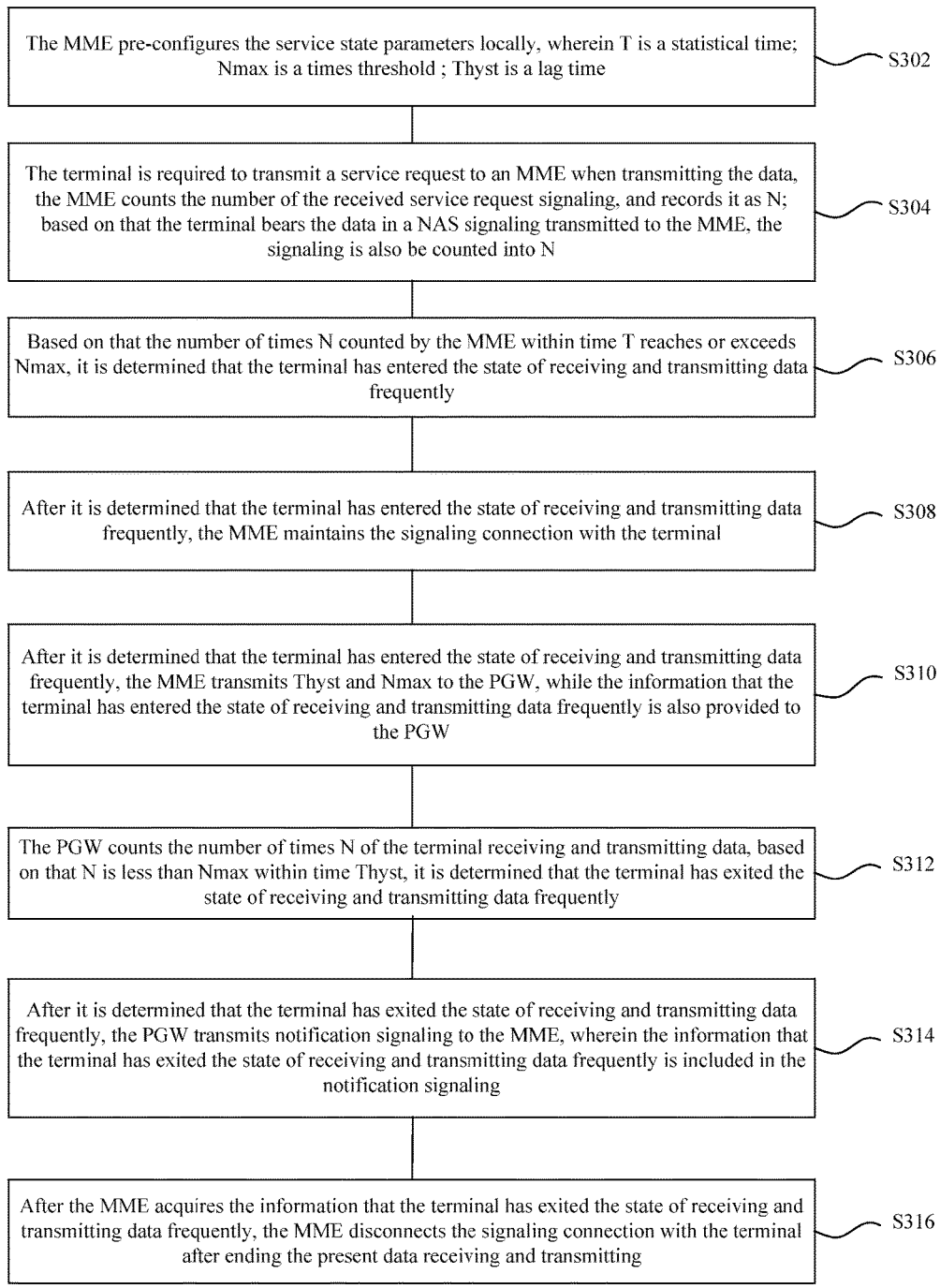
FIG. 3 is a flowchart of controlling signaling connection between a network and a terminal according to Preferred Embodiment I of the disclosure.

FIG. 3 is a flowchart of controlling signaling connection between a network and a terminal according to Preferred Embodiment I of the disclosure. As shown in FIG. 3, the method mainly includes the following steps (Step 302 to Step 316):

Step 302: The MME pre-configures the service state parameters locally, wherein T is a statistical time, used for defining the time when the number of times the data is received and transmitted is counted; Nmax is a times threshold, used for defining a threshold of whether to enter the state of receiving and transmitting data frequently; Thyst is a lag time, used for defining, after entering the state of receiving and transmitting data frequently, the time when the number of times the data is received and transmitted is counted and it is determined that the state is still kept;

Step 304: The terminal is required to transmit a service request to an MME when transmitting the data, the MME counts the number of the received service request signaling, and records it as N; based on that the terminal bears the data in a NAS signaling transmitted to the MME, the signaling is also be counted into N;

Step 306: Based on that the number of times N counted by the MME within time T reaches or exceeds Nmax, it is determined that the terminal has entered the state of receiving and transmitting data frequently;

Step 308: After it is determined that the terminal has entered the state of receiving and transmitting data frequently, the MME maintains the signaling connection with the terminal;

Step 310: After it is determined that the terminal has entered the state of receiving and transmitting data frequently, the MME transmits Thyst and Nmax to the PGW, while the information that the terminal has entered the state of receiving and transmitting data frequently is also provided to the PGW;

Step 312: The PGW counts the number of times N of the terminal receiving and transmitting data, based on that N is less than Nmax within time Thyst, it is determined that the terminal has exited the state of receiving and transmitting data frequently;

Step 314: After it is determined that the terminal has exited the state of receiving and transmitting data frequently, the PGW transmits notification signaling to the MME, wherein the information that the terminal has exited the state of receiving and transmitting data frequently is included in the notification signaling;

Step 316: After the MME acquires the information that the terminal has exited the state of receiving and transmitting data frequently, the MME disconnects the signaling connection with the terminal after ending the present data receiving and transmitting.

Figure 4:
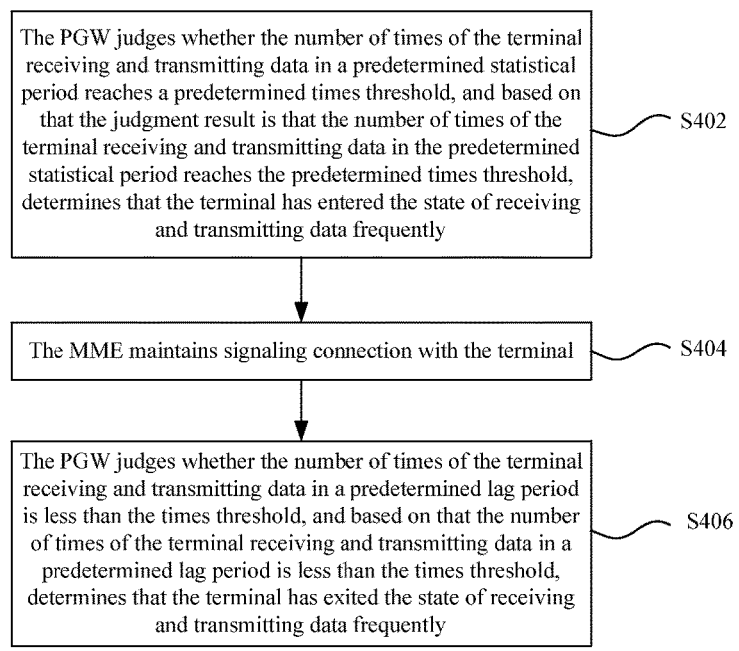
FIG. 4 is a flowchart of a method for controlling signaling connection between a network and a terminal according to Preferred Embodiment II of the disclosure.

FIG. 4 is a flowchart of a method for controlling signaling connection between a network and a terminal according to Embodiment II of the disclosure. As shown in FIG. 4, the method mainly includes the following steps (Step 402 to Step 406):

Step 402: The PGW judges whether the number of times of the terminal receiving and transmitting data in the pre-determined statistical period reaches a predetermined times threshold, and based on that the judgment result is that the number of times of the terminal receiving and transmitting data in the predetermined statistical period reaches a predetermined times threshold, determines that the terminal has entered the state of receiving and transmitting data frequently;

Step 404: The MME maintains signaling connection with the terminal; and

Step 406: The PGW judges whether the number of times of the terminal receiving and transmitting data in a predetermined lag period is less than the times threshold, and based on that the number of times of the terminal receiving and transmitting data in a predetermined lag period is less than the times threshold, determines that the terminal has exited the state of receiving and transmitting data frequently.

In the embodiment, before the PGW judges whether the number of times of the terminal receiving and transmitting data reaches the predetermined times threshold, the method includes that: the MME configures the statistical period, the times threshold and the lag period; and the MME transmits the statistical period, the times threshold and the lag period to the PGW.

In the embodiment, before the PGW judges whether the number of times of the terminal receiving and transmitting data reaches the predetermined times threshold, the method includes that: the PGW configures the statistical period, the times threshold and the lag period.

In the embodiment, after the PGW determines that the terminal has entered the state of receiving and transmitting data frequently, the method further includes that: the PGW transmits third state indication information to the MME that the terminal has entered the state of receiving and transmitting data frequently.

In the embodiment, after the PGW determines that the terminal has exited the state of receiving and transmitting data frequently, the method further includes that: the MME receives fourth state indication information from the PGW indicating that the terminal has exited the state of receiving and transmitting data frequently; and after the terminal ends receiving and transmitting data of this time, the MME disconnects the signaling connection with the terminal.

The method for controlling the signaling connection between the network and the terminal provided by Embodiment II will be further described below in conjunction with FIG. 5 and FIG. 6 and Preferred Embodiment II and Preferred Embodiment III.

Preferred Embodiment II

Figure 5:
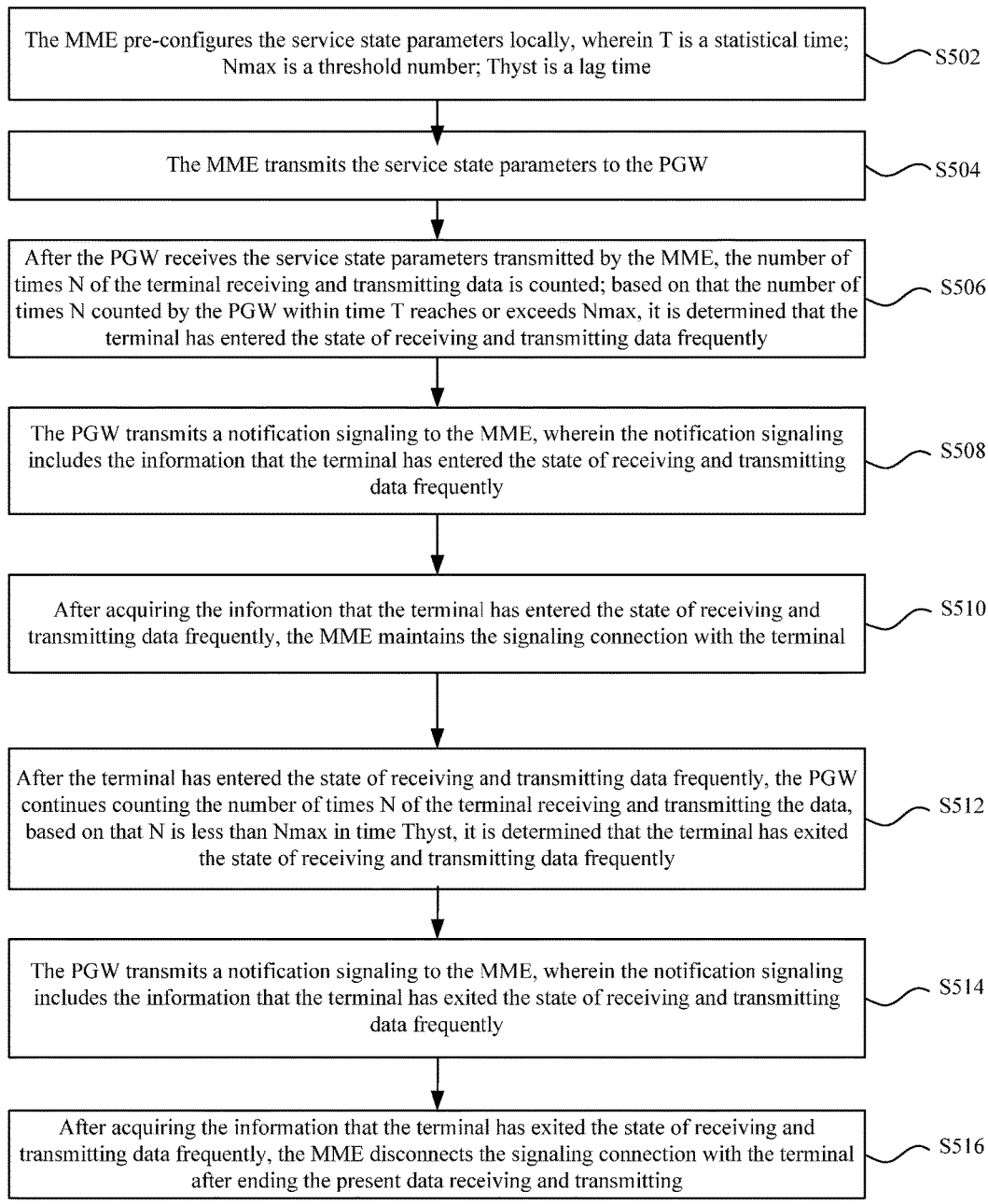
FIG. 5 is a flowchart of controlling signaling connection between a network and a terminal according to Preferred Embodiment II of the disclosure.

FIG. 5 is a flowchart of controlling signaling connection between a network and a terminal according to Preferred Embodiment II of the disclosure. As shown in FIG. 5, the method mainly includes the following steps (Step 502 to Step 506):

Step 502: The MME pre-configures the service state parameters locally, wherein T is a statistical time, used for defining the time when the number of times the data is received and transmitted is counted; Nmax is a times threshold, used for defining a threshold of whether to enter the state of receiving and transmitting data frequently; Thyst is a lag time, used for defining, after entering the state of receiving and transmitting data frequently, the time when the number of times the data is received and transmitted is counted and it is determined that the state is still kept;

Step 504: The MME transmits the service state parameters to the PGW;

Step 506: After the PGW receives the service state parameters transmitted by the MME, the number of times N of the terminal receiving and transmitting data is counted; based on that the number of times N counted by the PGW within time T reaches or exceeds Nmax, it is determined that the terminal has entered the state of receiving and transmitting data frequently;

Step 508: The PGW transmits a notification signaling to the MME, wherein the notification signaling includes the information that the terminal has entered the state of receiving and transmitting data frequently;

Step 510: After acquiring the information that the terminal has entered the state of receiving and transmitting data frequently, the MME maintains the signaling connection with the terminal;

Step 512: After the terminal has entered the state of receiving and transmitting data frequently, the PGW continues counting the number of times N of the terminal receiving and transmitting the data, based on that N is less than Nmax in time Thyst, it is determined that the terminal has exited the state of receiving and transmitting data frequently;

Step 514: the PGW transmits the notification signaling to the MME, wherein the notification signaling includes the information that the terminal has exited the state of receiving and transmitting data frequently;

Step 516: after acquiring that the terminal has exited the state of receiving and transmitting data frequently, the MME disconnects the signaling connection with the terminal after ending the present data receiving and transmitting.

Embodiment III

Figure 6:
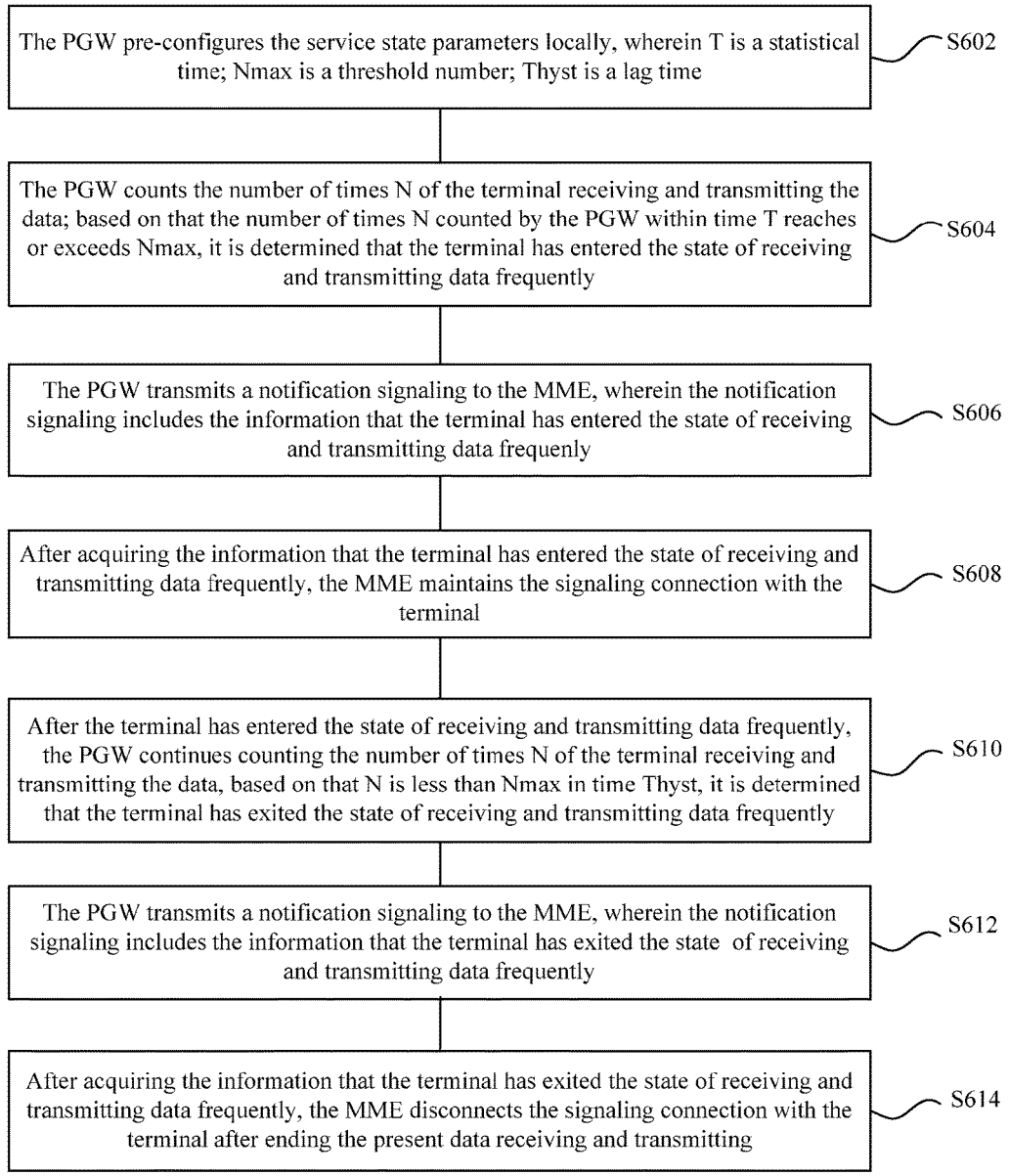
FIG. 6 is a flowchart of controlling signaling connection between a network and a terminal according to Preferred Embodiment III of the disclosure.

FIG. 6 is a flowchart of controlling signaling connection between a network and a terminal according to Preferred Embodiment III of the disclosure. As shown in FIG. 6, the method mainly includes the following steps (Step 602 to Step 614):

Step 602: The PGW pre-configures the service state parameters locally, wherein T is a statistical time, used for defining the time when the number of times the data is received and transmitted is counted; Nmax is a times threshold, used for defining a threshold of whether to enter the state of receiving and transmitting data frequently; Thyst is a lag time, used for defining, after entering the state of receiving and transmitting data frequently, the time when the number of times the data is received and transmitted is counted and it is determined that the state is still kept;

Step 604: The PGW counts the number of times N of the terminal receiving and transmitting the data; based on that the number of times N counted by the PGW within time T reaches or exceeds Nmax, it is determined that the terminal has entered the state of receiving and transmitting data frequently;

Step 606: The PGW transmits a notification signaling to the MME, wherein the notification signaling includes the information that the terminal has entered the state of receiving and transmitting data frequently;

Step 608: After acquiring the information that the terminal has entered the state of receiving and transmitting data frequently, the MME maintains the signaling connection with the terminal;

Step 610: After the terminal has entered the state of receiving and transmitting data frequently, the PGW continues counting the number of times N of the terminal receiving and transmitting the data, based on that N is less than Nmax in time Thyst, it is determined that the terminal has exited the state of receiving and transmitting data frequently;

Step 612: The PGW transmits a notification signaling to the MME, wherein the notification signaling includes the information that the terminal has exited the state of receiving and transmitting data frequently;

Step 614: After acquiring the information that the terminal has exited the state of receiving and transmitting data frequently, the MME disconnects the signaling connection with the terminal after ending the present data receiving and transmitting.

By adopting the method for controlling the signaling connection between the network and the terminal provided by above embodiments, the problem that various frequent switching operations of the terminal cause large power consumption is solved, and the effect of avoiding frequent switching between the connected mode and the idle mode of the terminal is achieved.

Figure 7:
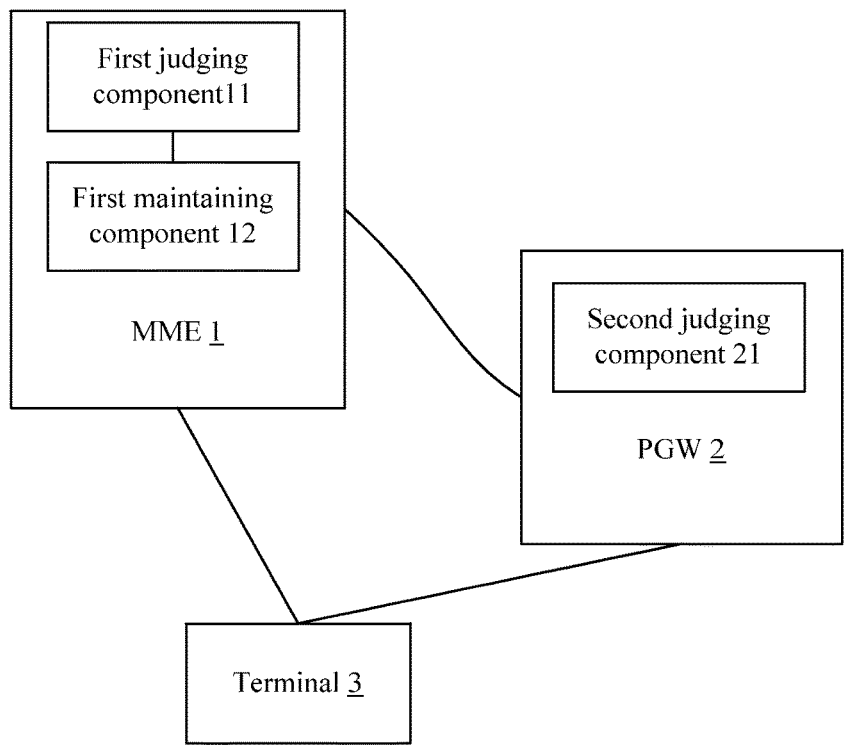
FIG. 7 is a structural diagram of a system for controlling signaling connection between a network and a terminal according to Embodiment I of the disclosure.

FIG. 7 is a structural diagram of a system for controlling signaling connection between a network and a terminal according to Embodiment I of the disclosure. The system is used for implementing the method for controlling the signaling connection between the network and the terminal provided by the above embodiments. As shown in FIG. 7, the system includes: an MME 1, a PGW 2 and the terminal 3, wherein the MME 1 includes a first judging component 11, configured to judge whether the number of times of the terminal receiving and transmitting data in a predetermined statistical period reaches a predetermined times threshold, and based on that the judgment result is that the number of times of the terminal receiving and transmitting data in the predetermined statistical period reaches the predetermined times threshold, determine that the terminal has entered a state of receiving and transmitting data frequently; a first maintaining component 12, configured to maintain signaling connection with the terminal; and the PGW 2 includes: a second judging component 21, configured to, judge whether the number of times of the terminal receiving and transmitting in a predetermined lag period is less than the times threshold, and based on that the number of times of the terminal receiving and transmitting in the predetermined lag period is less than the times threshold, determine that the terminal has exited the state of receiving and transmitting data frequently.

Figure 8:
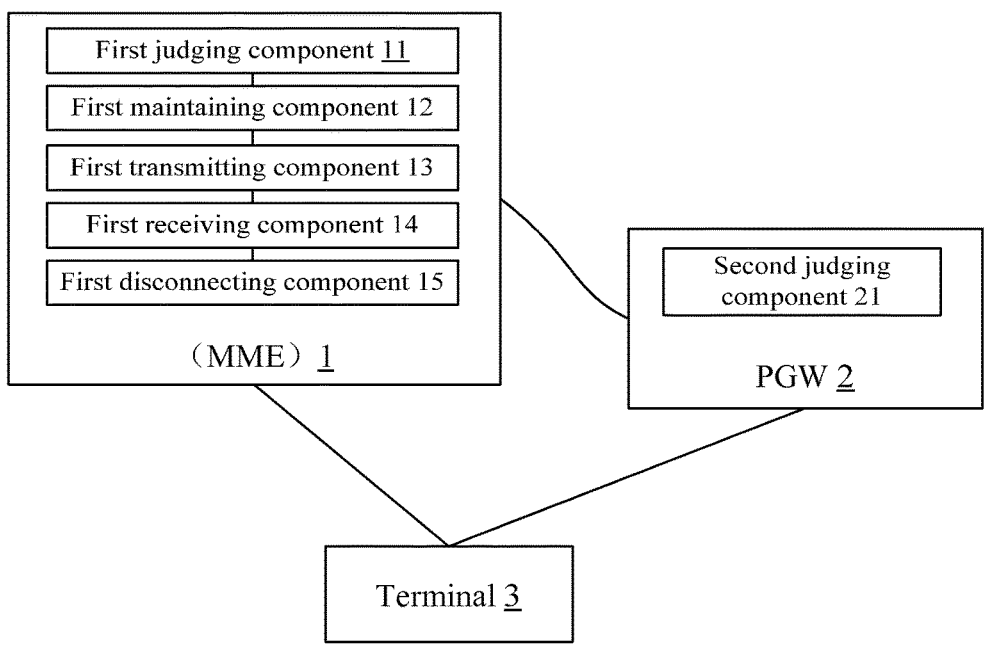
FIG. 8 is a structural diagram of a system for controlling signaling connection between a network and a terminal according to Preferred Embodiment I of the disclosure.

FIG. 8 is a structural diagram of a system for controlling signaling connection between a network and a terminal according to Preferred Embodiment I of the disclosure. In the Preferred Embodiment I, the MME 1 further includes: a first transmitting component 13, configured to, after the first maintaining component maintains the signaling connection with the terminal, transmit the times threshold, the lag period and first state indication information to the PGW 2, wherein the first state indication information indicates that the terminal has entered the state of receiving and transmitting data frequently.

In Preferred Embodiment I, the MME further comprises: a first receiving component 14, configured to receive second state indication information from the PGW 2 indicating that the terminal has exited the state of receiving and transmitting data frequently; and a first disconnecting component 15, configured to, after the terminal ends receiving and transmitting data of this time, disconnect the signaling connection with the terminal.

Figure 9:
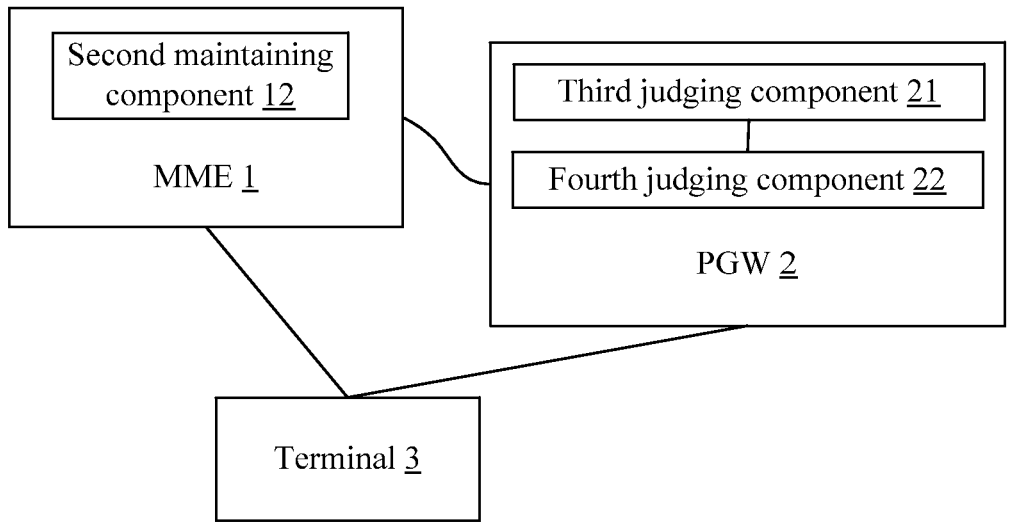
FIG. 9 is a structural diagram of a system for controlling signaling connection between a network and a terminal according to Embodiment II of the disclosure.

FIG. 9 is a structural diagram of a system for controlling signaling connection between a network and a terminal according to Embodiment II of the disclosure. The system is used for implementing the method for controlling the signaling connection between the network and the terminal provided by the above embodiments. As shown in FIG. 9, the system includes: an MME 1, a PGW 2 and a terminal 3, wherein the PGW 2 includes: a third judging component 21, configured to judge whether the number of times of the terminal receiving and transmitting data in a predetermined statistical period reaches a predetermined times threshold, and based on that the judgment result is that the number of times of the terminal receiving and transmitting data in a predetermined statistical period reaches a predetermined times threshold, determine that the terminal has entered a state of receiving and transmitting data frequently; the MME 1 includes: a second maintaining component 11, configured to maintain signaling connection with the terminal; and the PGW 2 further includes: a fourth judging component 22, configured to judge whether the number of times of the terminal receiving and transmitting data in a predetermined lag period is less than the times threshold, and based on that the number of times of the terminal receiving and transmitting data in a predetermined lag period is less than the times threshold, determine that the terminal has exited the state of receiving and transmitting data frequently.

Figure 10:
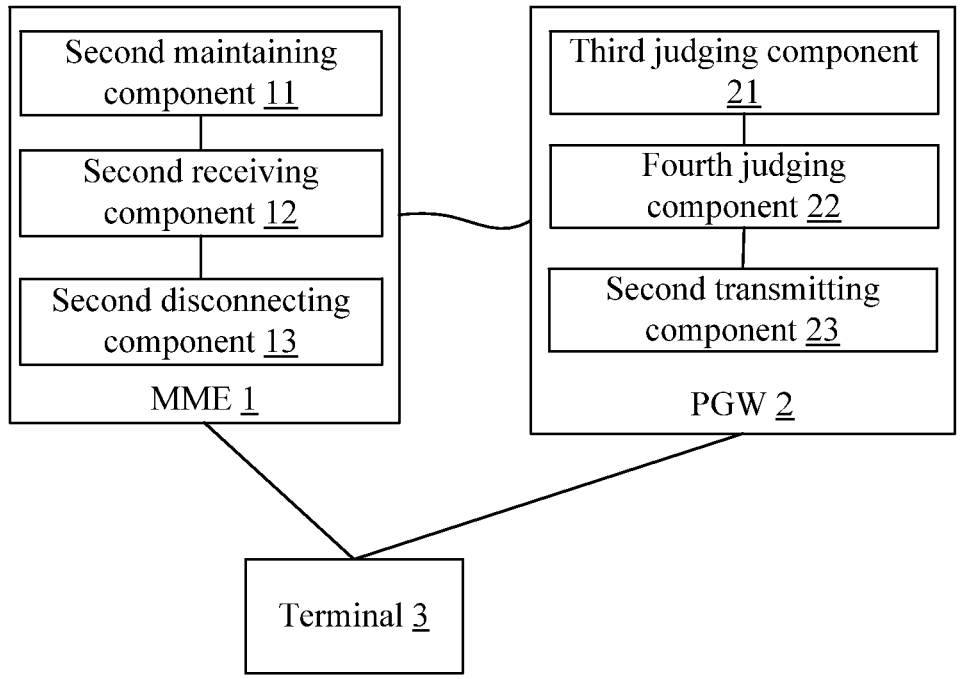
FIG. 10 is a structural diagram of a system for controlling signaling connection between a network and a terminal according to Preferred Embodiment II of the disclosure.

FIG. 10 is a structural diagram of a system for controlling signaling connection between a network and a terminal according to Preferred Embodiment II of the disclosure. In the Preferred Embodiment II, the PGW 2 further includes: a second transmitting component 23, configured to, after it is determined that the terminal has entered the state of receiving and transmitting data frequently, transmit third state indication information to the MME 1 indicating that the terminal has entered the state of receiving and transmitting data frequently.

In the Preferred Embodiment II, the MME 1 further includes: a second receiving component 12, configured to, after the PGW 2 determines that the terminal has exited the state of receiving and transmitting data frequently, receive fourth state indication information from the PGW 2 indicating that the terminal has exited the state of receiving and transmitting data frequently; and a second disconnecting component 13, configured to, after the terminal ends receiving and transmitting data of this time, disconnect the signaling connection with the terminal.

By adopting the system for controlling the signaling connection between the network and the terminal provided by above embodiments, the problem that various frequent switching operations of the terminal cause large power consumption is solved, and the effect of avoiding frequent switching between the connected mode and the idle mode of the terminal is achieved.

It can be see from the above description that the disclosure implements the following technical effects:

It is determined that the terminal has entered the state of receiving and transmitting data frequently when the number of times of the terminal receiving and transmitting data reaches the predetermined number of times, and the signaling connection between the MME and the terminal is maintained; It is determined that the terminal has exited the state of receiving and transmitting data frequently when the number of times of the terminal receiving and transmitting the data is less than the predetermined number of times, and the connection between the MME and the terminal is disconnected. By this way, the problem that various frequent switching operations of the terminal cause large power consumption may be solved, and the effect of preventing frequent switching between the connected mode and the idle mode of the terminal is achieved.

Obviously, those skilled in the art should understand that each of the mentioned modules or steps of the disclosure may be achieved by a universal computing apparatus; the modules or steps may be integrated on a single computing apparatus, or distributed in a network formed by multiple computing apparatuses. Selectively, they may be achieved by a program code which may be executed by the computing apparatus. Thereby, the modules or steps may be stored in a storage apparatus and executed by the computing apparatus, and in some cases, the steps shown or described may be executed in an order different from here, or may be respectively manufactured as each integrated circuit module, or multiple modules or steps thereof may be manufactured as single integrated circuit module. In this way, the disclosure is not limited to any particular combination of hardware and software.

The above are only the preferred embodiments of the disclosure and are not intended to limit the disclosure, for those skilled in the art, various changes and variations may be made to the disclosure. Any modifications, equivalent replacements, improvements and the like within the spirit and principle of the disclosure shall be contained within the scope of protection of the claims of the disclosure.

What is claimed is:

1. A method for controlling signaling connection between a network and a terminal, comprising:
    judging, by a Mobility Management Element (MME), whether the number of times of the terminal receiving and transmitting data in a predetermined statistical period, reaches a predetermined times threshold, and based on that a judgment result is that the number of times of the terminal receiving and transmitting data in the predetermined statistical period, reaches the predetermined times threshold, determining that the terminal has entered a state of receiving and transmitting data frequently;
    maintaining, by the MME, signaling connection with the terminal; and
    judging, by a Packet Data Network Gateway (PGW), whether the number of times of the terminal receiving and transmitting data in a predetermined lag period is less than the predetermined times threshold, and based on that the number of times of the terminal receiving and transmitting data in the predetermined lag period is less than the predetermined times threshold, determining that the terminal has exited the state of receiving and transmitting data frequently;
wherein before judging, by the MME, whether the number of times of the terminal receiving and transmitting data reaches the predetermined times threshold, the method further comprises:
configuring, by the MME, the statistical period, the predetermined times threshold and the lag period;
counting, by the MME, the number of times of the terminal receiving and transmitting data in the statistical period, wherein the number of times of receiving and transmitting data refers to the number of service request signaling of the terminal that the MME receives in the statistical period, or the sum of the number of the service request signaling of the terminal and the number of Non-Access Stratum (NAS) signaling of bearer data that the terminal transmits to the MME.

2. The method according to claim 1, after maintaining, by the MME, the signaling connection with the terminal, further comprising:
transmitting, by the MME, the predetermined times threshold, the lag period and first state indication information to the PGW, wherein the first state indication information indicates that the terminal has entered the state of receiving and transmitting data frequently.

3. The method according to claim 2, after determining, by the PGW, that the terminal has exited the state of receiving and transmitting data frequently, further comprising:
receiving, by the MME, second state indication information from the PGW indicating that the terminal has exited the state of receiving and transmitting data frequently; and
after the terminal ends receiving and transmitting data of this time, disconnecting, by the MME, the signaling connection with the terminal.

4. A system for controlling signaling connection between a network and a terminal, comprising: a Mobility Management Element (MME), a Packet Data Network Gateway (PGW) and the terminal, wherein
the MME comprises:
a first judging component, configured to judge whether the number of times of the terminal receiving and transmitting data in a predetermined statistical period, reaches a predetermined times threshold, and based on that a judgment result is that the number of times of the terminal receiving and transmitting data in the predetermined statistical period, reaches the predetermined times threshold, determine that the terminal has entered a state of receiving and transmitting data frequently;
a first maintaining component, configured to maintain signaling connection with the terminal; and
the PGW comprises:
a second judging component, configured to, judge whether the number of times of the terminal receiving and transmitting data in a predetermined lag period is less than the predetermined times threshold, and based on that the number of times of the terminal receiving and transmitting data in the predetermined lag period is less than the predetermined times threshold, determine that the terminal has exited the state of receiving and transmitting data frequently;
wherein before judging, by the MME, whether the number of times of the terminal receiving and transmitting data reaches the predetermined times threshold, the MME is further configured to:
configure the statistical period, the predetermined times threshold and the lag period;

count the number of times of the terminal receiving and transmitting data in the statistical period, wherein the number of times of receiving and transmitting data refers to the number of service request signaling of the terminal that the MME receives in the statistical period, or the sum of the number of the service request signaling of the terminal and the number of Non-Access Stratum (NAS) signaling of bearer data that the terminal transmits to the MME.

5. The system according to claim 4, wherein the MME further comprises:
a first transmitting component, configured to, after the first execution module first maintaining component maintains the signaling connection with the terminal, transmit the predetermined times threshold, the lag period and first state indication information to the PGW, wherein the first state indication information indicates that the terminal has entered the state of receiving and transmitting data frequently.

6. The system according to claim 4, wherein the MME further comprises:
a first receiving component, configured to receive second state indication information from the PGW indicating that the terminal has exited the state of receiving and transmitting data frequently; and
a first disconnecting component, configured to, after the terminal ends receiving and transmitting data of this time, disconnect the signaling connection with the terminal.

7. The system according to claim 5, wherein the MME further comprises:
a first receiving component, configured to receive second state indication information from the PGW indicating that the terminal has exited the state of receiving and transmitting data frequently; and
a first disconnecting component, configured to, after the terminal ends receiving and transmitting data of this time, disconnect the signaling connection with the terminal.

8. A method for controlling signaling connection between a network and a terminal, comprising:
judging, by a Packet Data Network Gateway (PGW), whether the number of times of the terminal receiving and transmitting data in a predetermined statistical period, reaches a predetermined times threshold, and based on that a judgment result is that the number of times of the terminal receiving and transmitting data in the predetermined statistical period, reaches the predetermined times threshold, determining that the terminal has entered a state of receiving and transmitting data frequently;
maintaining, by an MME, signaling connection with the terminal; and
judging, by the PGW, whether the number of times of the terminal receiving and transmitting data in a predetermined lag period is less than the predetermined times threshold, and based on that the number of times of the terminal receiving and transmitting data in the predetermined lag period is less than the predetermined times threshold, determining that the terminal has exited the state of receiving and transmitting data frequently;
wherein after determining, by the PGW, that the terminal has entered the state of receiving and transmitting data frequently, the method further comprises:

transmitting, by the PGW, third state indication information to the MME indicating that the terminal has entered the state of receiving and transmitting data frequently.

9. The method according to claim 8, before judging, by the PGW, whether the number of times of the terminal receiving and transmitting data reaches the predetermined times threshold, further comprising:
configuring, by the MME, the statistical period, the predetermined times threshold and the lag period; and
transmitting, by the MME, the statistical period, the predetermined times threshold and the lag period to the PGW.

10. The method according to claim 8, before judging, by the PGW, whether the number of times of the terminal receiving and transmitting data reaches the predetermined times threshold, further comprising:
configuring, by the PGW, the statistical period, the predetermined times threshold and the lag period.

11. The method according to claim 8, after determining, by the PGW, that the terminal has exited the state of receiving and transmitting data frequently, further comprising:
receiving, by the MME, fourth state indication information from the PGW indicating that the terminal has exited the state of receiving and transmitting data frequently; and
after the terminal ends receiving and transmitting data of this time, disconnecting, by the MME, the signaling connection with the terminal.

* * * * *